(12) United States Patent
Frank et al.

(10) Patent No.: US 7,475,599 B2
(45) Date of Patent: Jan. 13, 2009

(54) WET SLURRY THICKNESS GAUGE AND METHOD FOR USE OF SAME

(75) Inventors: William A. Frank, Lake Villa, IL (US); Abraham M. Underkofler, Waukegan, IL (US); William J. Rago, Gurnee, IL (US)

(73) Assignee: United States Gypsum Company, Chicago, IL (US)

( * ) Notice: Subject to any disclaimer, the term of this patent is extended or adjusted under 35 U.S.C. 154(b) by 70 days.

(21) Appl. No.: 11/555,665

(22) Filed: Nov. 1, 2006

(65) Prior Publication Data

US 2008/0110276 A1 May 15, 2008

(51) Int. Cl.
G01B 7/16 (2006.01)
G01F 25/00 (2006.01)
G01L 1/00 (2006.01)

(52) U.S. Cl. ....................................................... 73/803
(58) Field of Classification Search ................... 73/803
See application file for complete search history.

(56) References Cited

U.S. PATENT DOCUMENTS

| | | | |
|---|---|---|---|
| 1,578,250 A | | 3/1926 | Armstrong |
| 1,600,089 A | * | 9/1926 | Bush ........................... 33/517 |
| 2,134,184 A | * | 10/1938 | Guyer ......................... 33/804 |
| 2,213,442 A | | 9/1940 | Elliott |
| 2,344,595 A | * | 3/1944 | Calow et al. ................ 33/501.4 |
| 2,835,980 A | * | 5/1958 | Rose ............................ 33/556 |
| 3,216,118 A | * | 11/1965 | Pistoles ........................ 33/558 |
| 3,578,517 A | | 5/1971 | Lapp et al. |
| 3,699,789 A | * | 10/1972 | Potzick ........................ 70/329 |
| 4,105,383 A | | 8/1978 | Hanson |
| 4,203,788 A | | 5/1980 | Clear |
| 4,298,413 A | | 11/1981 | Teare |
| 4,327,146 A | | 4/1982 | White |
| 4,344,804 A | | 8/1982 | Bijen et al. |
| 4,378,405 A | | 3/1983 | Pilgrim |
| 4,420,299 A | | 12/1983 | De Mets |
| 4,450,022 A | | 5/1984 | Galer |
| 4,476,634 A | * | 10/1984 | Yamamoto et al. ......... 33/501.4 |
| 4,477,300 A | | 10/1984 | Pilgrim |
| 4,488,917 A | | 12/1984 | Porter et al. |
| 4,489,496 A | * | 12/1984 | Mizuno et al. ................ 33/558 |

(Continued)

FOREIGN PATENT DOCUMENTS

WO 02098646 12/2002

*Primary Examiner*—Edward Lefkowitz
*Assistant Examiner*—Octavia Davis
(74) *Attorney, Agent, or Firm*—Novak Druce & Quigg LLP (57) ABSTRACT

A handheld wet slurry thickness gauge and method for its use. The thickness gauge includes a distance displacement measurement gauge, a skirt, a platen and support legs. The distance displacement measurement gauge includes a case, a vertical stem, and a vertical spindle. The stem extends from the case. The spindle is slidably supported to move in an axial direction within the stem. The case body has a display for indicating a linear displacement of the spindle. The skirt has a central through-hole for receiving the stem of the gauge and retaining the stem in an upright position. The measuring platen has a platen base and a platen shaft extending upwardly from the platen base and attached to the spindle. The support legs extend downwardly from the skirt. The platen is below the skirt.

20 Claims, 7 Drawing Sheets

U.S. PATENT DOCUMENTS

| | | |
|---|---|---|
| 4,504,335 A | 3/1985 | Galer |
| RE32,037 E | 11/1985 | Clear |
| 4,793,892 A | 12/1988 | Miller et al. |
| 4,816,091 A | 3/1989 | Miller |
| 4,847,022 A | 7/1989 | Bold |
| 4,947,555 A * | 8/1990 | Allen, III .................. 33/199 R |
| 5,221,386 A | 6/1993 | Ensminger et al. |
| 5,342,566 A | 8/1994 | Schafer |
| 5,350,554 A | 9/1994 | Miller |
| 5,520,779 A | 5/1996 | Bold |
| 5,643,510 A | 7/1997 | Sucech |
| 5,714,001 A | 2/1998 | Savoly et al. |
| 5,718,797 A | 2/1998 | Phillips et al. |
| 5,854,426 A | 12/1998 | Benda |
| 5,979,069 A * | 11/1999 | Hayashida et al. ............ 33/556 |
| 6,187,409 B1 | 2/2001 | Mathieu |
| 6,190,476 B1 | 2/2001 | Seecharan et al. |
| 6,342,284 B1 | 1/2002 | Yu et al. |
| 6,409,825 B1 | 6/2002 | Yu et al. |
| 6,443,258 B1 | 9/2002 | Putt et al. |
| 6,488,792 B2 | 12/2002 | Mathieu |
| 6,524,679 B2 | 2/2003 | Hauber et al. |
| 6,547,901 B1 | 4/2003 | Gerlich |
| 6,605,148 B2 | 8/2003 | Shirakawa et al. |
| 6,774,146 B2 | 8/2004 | Savoly et al. |
| 6,866,492 B2 | 3/2005 | Hauber et al. |
| 6,869,482 B2 | 3/2005 | Mutsui et al. |
| 6,874,930 B2 | 4/2005 | Wittbold et al. |
| 6,878,321 B2 | 4/2005 | Hauber et al. |
| 6,893,752 B2 | 5/2005 | Veeramasuneni et al. |
| 2001/0000738 A1 | 5/2001 | Mathieu |
| 2004/0084127 A1 | 5/2004 | Porter |
| 2004/0231916 A1 | 11/2004 | Englert et al. |
| 2005/0075030 A1 | 4/2005 | Coon et al. |
| 2005/0121131 A1 | 6/2005 | Hennis et al. |
| 2005/0159057 A1 | 7/2005 | Hauber et al. |
| 2007/0110838 A1 | 5/2007 | Porter et al. |
| 2007/0110970 A1 | 5/2007 | Dubey |
| 2008/0099133 A1 | 5/2008 | Stivender |
| 2008/0099171 A1 | 5/2008 | Frank et al. |
| 2008/0101150 A1 | 5/2008 | George et al. |
| 2008/0101151 A1 | 5/2008 | Frank et al. |

* cited by examiner

WET SLURRY THICKNESS GAUGE AND METHOD FOR USE OF SAME

CROSS REFERENCE TO RELATED APPLICATIONS

This application is related to co-pending:

U.S. patent application Ser. No. 11/555,647, entitled PROCESS AND APPARATUS FOR FEEDING CEMENTITIOUS SLURRY FOR FIBER-REINFORCED STRUCTURAL CEMENT PANELS, filed Nov. 1, 2006;

U.S. patent application Ser. No. 11/555,655, entitled METHOD FOR WET MIXING CEMENTITIOUS SLURRY FOR FIBER-REINFORCED STRUCTURAL CEMENT PANELS, filed Nov. 1, 2006;

U.S. patent application Ser. No. 11/555,658, entitled APPARATUS AND METHOD FOR WET MIXING CEMENTITIOUS SLURRY FOR FIBER-REINFORCED STRUCTURAL CEMENT PANELS, filed Nov. 1, 2006;

U.S. patent application Ser. No. 11/555.661, entitled PANEL SMOOTHING PROCESS AND APPARATUS FOR FORMING A SMOOTH CONTINUOUS SURFACE ON FIBER-REINFORCED STRUCTURAL CEMENT PANELS, filed Nov. 1, 2006;

U.S. patent application Ser. No. 11/591,793, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006; and U.S. patent application Ser. No. 11/591,957, entitled EMBEDMENT ROLL DEVICE, filed Nov. 1, 2006;

all herein incorporated by reference in their entirety.

FIELD OF THE INVENTION

This invention relates to thickness gauge for measuring slurry depth. More particularly this invention relates to a thickness gauge for measuring depth of a cementitious slurry.

BACKGROUND OF THE INVENTION

Cementitious panels have been used in the construction industry to form the interior and exterior walls of residential and/or commercial structures. The advantages of such panels include resistance to moisture compared to standard gypsum-based wallboard. However, a drawback of such conventional panels is that they do not have sufficient structural strength to the extent that such panels may be comparable to, if not stronger than, structural plywood or oriented strand board (OSB).

Typically, the cementitious panel includes at least one hardened cement composite layer between layers of a reinforcing or stabilizing material. In some instances, the reinforcing or stabilizing material is fiberglass mesh or the equivalent. The mesh is usually applied from a roll in sheet fashion upon or between layers of settable slurry. Examples of production techniques used in conventional cementitious panels are provided in U.S. Pat. Nos. 4,420,295; 4,504,335 and 6,176,920, the contents of which are incorporated by reference herein. Further, other gypsum-cement compositions are disclosed generally in U.S. Pat. Nos. 5,685,903; 5,858,083 and 5,958,131.

U.S. Pat. No. 6,620,487 to Tonyan, which is incorporated herein by reference in its entirety, discloses a reinforced, lightweight, dimensionally stable panel capable of resisting shear loads when fastened to framing equal to or exceeding shear loads provided by plywood or oriented strand board panels. The panels employ a core of a continuous phase resulting from the curing of an aqueous mixture of calcium sulfate alpha hemihydrate, hydraulic cement, an active pozzolan and lime, the continuous phase being reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the panels may include a cured continuous phase reinforced with glass fibers and containing sufficient polymer spheres to improve nailability or made with a water-to-reactive powders ratio to provide an effect similar to polymer spheres, or a combination thereof.

US Patent Application Publication No. 2005/0064055 to Porter, application Ser. No. 10/665,541, which is incorporated herein by reference in its entirety, discloses an embedment device for use in a structural panel production line wherein a slurry is transported on a moving carrier relative to a support frame, and chopped fibers are deposited upon the slurry, includes a first elongate shaft secured to the support frame and having a first plurality of axially spaced disks, a second elongate shaft secured to the support frame and having a second plurality of axially spaced disks, the first shaft being disposed relative to the second shaft so that the disks intermesh with each other. The intermeshing relationship enhances embedment of the fibers into the slurry and also prevents clogging of the device by prematurely set slurry particles.

US Patent Application Publication No. 2005/0064164 to Dubey et al., application Ser. No. 10/666,294, incorporated herein by reference in its entirety, discloses a multi-layer process for producing structural cementitious panel which includes: (a.) providing a moving web; (b.) one of (i) depositing a first layer of individual, loose fibers upon the web, followed by depositing a layer of settable slurry upon the web and (ii) depositing a layer of settable slurry upon the web; (c.) depositing a second layer of individual, loose fibers upon the slurry; (d.) actively embedding said second layer of individual, loose fibers into the slurry to distribute said fibers throughout the slurry; and (e.) repeating steps (ii) through (d.) until the desired number of layers of settable fiber-enhanced slurry is obtained and so that the fibers are distributed throughout the panel. Also provided are a structural panel produced by the process, an apparatus suitable for producing structural cementitious panels according to the process, and a structural cementitious panel having multiple layers, each layer created by depositing a layer of settable slurry upon a moving web, depositing fibers upon the slurry and embedding the fibers into the slurry such that each layer is integrally formed with the adjacent layers.

U.S. Pat. No. 6,986,812 of Dubey et al., incorporated herein by reference in its entirety, features a slurry feed apparatus for use in a SCP panel production line or the like application where settable slurries are used in the production of building panels or board. The apparatus includes a main metering roll and a companion roll placed in close, generally parallel relationship to each other to form a nip in which a supply of slurry is retained. Both rolls preferably rotate in the same direction so that slurry is drawn from the nip over the metering roll to be deposited upon a moving web of the SCP panel production line. A thickness control roll is provided in close operational proximity to the main metering roll for maintaining a desired thickness of the slurry.

U.S. Patent Application Publication No. 2006/0174572 to Tonyan et al., incorporated herein by reference in its entirety, discloses non-combustible SCP panel metal frame systems for shear walls.

Furthermore, the above-described cementitious structural panels, also referred to as SCP's, are preferably configured to behave in the construction environment similar to plywood and OSB. Thus, the SCP panels are preferably nailable and can be cut or worked using conventional saws and other conventional carpentry tools. Further, the SCP panels should meet building code standards for shear resistance, load capacity, water-induced expansion and resistance to combustion, as measured by recognized tests, such as ASTM E72, ASTM 661, ASTM C 1185 and ASTM E136 or equivalent, as applied to structural plywood sheets.

It would be desirable to provide an easy to use tool for determining the thickness of the slurry panel on the production line, prior to setting, to assist in quality control while preparing the SCP panels.

SUMMARY OF THE INVENTION

The present invention features a handheld electronic thickness gauge for determining the thickness of the wet fiber reinforced gypsum-cementitious slurry across its entire surface area as it exits each of the forming stations on a panel production line.

The unique design of the instant handheld thickness gauge allows for a pre-set to measure the exact thickness of the slurry layer in real time without having the thickness gauge spindle sinking into the slurry layer.

The thickness gauge has a distance displacement measurement gauge, a skirt attached to the distance displacement measurement gauge, legs extending downwardly from the skirt, and a platen extending from a linearly movable spindle of the distance displacement measurement gauge.

The platen has a shaft and a base. Preferably the platen base and shaft form a single piece. However, if desired the measuring platen with the central shaft and the screw point on the central shaft are assembled from two pieces. For example, if desired the platen shaft may be attached to the platen base, by screwing the platen shaft into an opening in the platen base. The platen base is large enough in cross section to rest on the slurry surface as legs extending from a skirt are pushed into a slurry layer. The linear displacement of the platen base resting on the top surface of the slurry, relative to the legs penetrating the slurry, linearly displaces the spindle to result in an accurate measure of the slurry thickness.

The thickness gauge is advantageous for reliably measuring thickness of slurry layers, prior to the setting of the slurry, to assist in quality control.

For example, the thickness gauge is useful to measure thickness of a slurry panel on a production line, prior to setting, to assist in quality control in a multi-layer process for producing structural cementitious panels (SCP's or SCP panels). In a process for making SCP panels, after one of an initial deposition of loosely distributed, chopped fibers or a layer of slurry upon a moving web, fibers are deposited upon the slurry layer. An embedment device thoroughly mixes the recently deposited fibers into the slurry so that the fibers are distributed throughout the slurry, after which additional layers of slurry, then chopped fibers are added, followed by more embedment. The process is repeated for each layer of the panel, as desired. Upon completion, the board has a more evenly distributed fiber component, which results in relatively strong panels without the need for thick mats of reinforcing fibers, as are taught in prior art production techniques for cementitious panels.

In a preferred embodiment, of the process multiple layers of chopped individual loose fibers are deposited relative to each layer of deposited slurry. The typical sequence is that a layer of loose fibers are deposited, upon either the moving web or existing slurry, followed by a layer of slurry, then another layer of fibers. Next, the fiber/slurry/fiber combination is subjected to embedding to thoroughly mix the fibers in the slurry. This procedure has been found to permit the incorporation and distribution of a relatively larger amount of slurry fibers throughout the slurry using fewer slurry layers. Thus, panel production equipment and processing time can be reduced, while providing an SCP panel with enhanced strength characteristics.

More specifically, a process is provided for producing structural cementitious panels made of at least one layer of fiber reinforced cementitious slurry, the process for each such layer of slurry including providing a moving web; depositing a first layer of individual, loose fibers upon the web; depositing a layer of settable slurry upon the deposited first layer of individual, loose fibers; depositing a second layer of individual, loose fibers upon the deposited layer of settable slurry; and actively embedding both layers of individual, loose fibers into the layer of slurry to distribute the fibers throughout the slurry The process may employ an apparatus for producing a multi-layered structural cementitious panel includes a conveyor-type frame supporting a moving web; a first loose fiber distribution station in operational relationship to the frame and is configured for depositing loose fibers upon the moving web; a first slurry feed station in operational relationship to the frame and configured for depositing a thin layer of settable slurry upon the moving web so that the fibers are covered. A second loose fiber distribution station is provided in operational relationship to the frame and is configured for depositing loose fibers upon the slurry. An embedment device is in operational relationship to the frame and is configured for generating a kneading action in the slurry to embed the fibers into the slurry.

The present wet slurry thickness gauge can assist in quality control of the above processes by providing accurate reliable thickness measurements of the slurry panels prior to their setting.

DETAILED DESCRIPTION OF THE INVENTION

Wet Slurry Thickness Gauge

Figure 1:
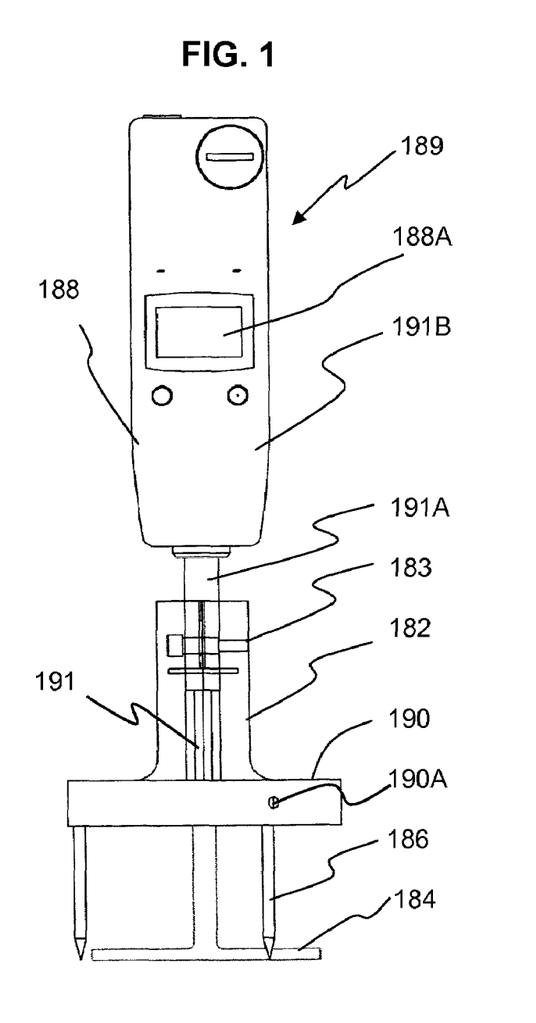
FIG. 1 is a front sectional view of the electronic wet slurry thickness gauge of the present invention.
Figure 2:
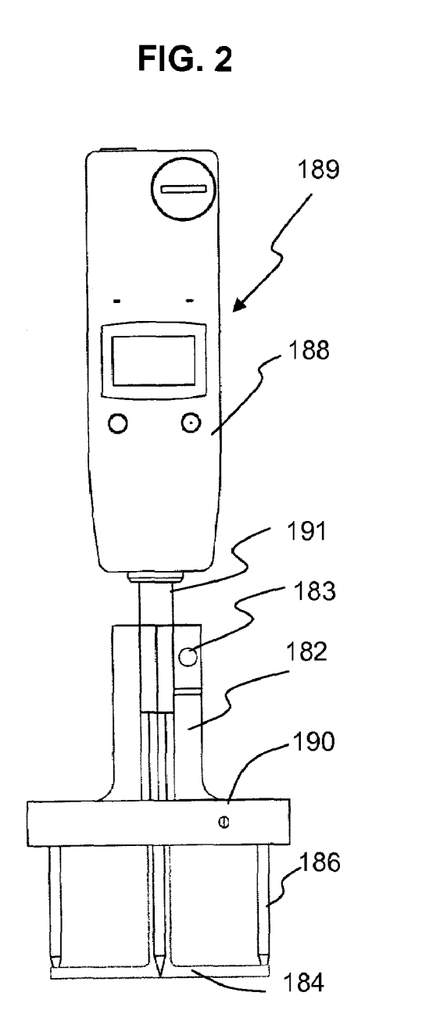
FIG. 2 is a side cross sectional views of the electronic wet slurry thickness gauge of the present invention.

FIG. 1 shows a side view of a wet slurry thickness gauge 189. The wet slurry thickness gauge 189 comprises a distance displacement measurement gauge 188, a skirt 182, a platen 184, and support legs (also termed "pins") 186.

Figure 9:
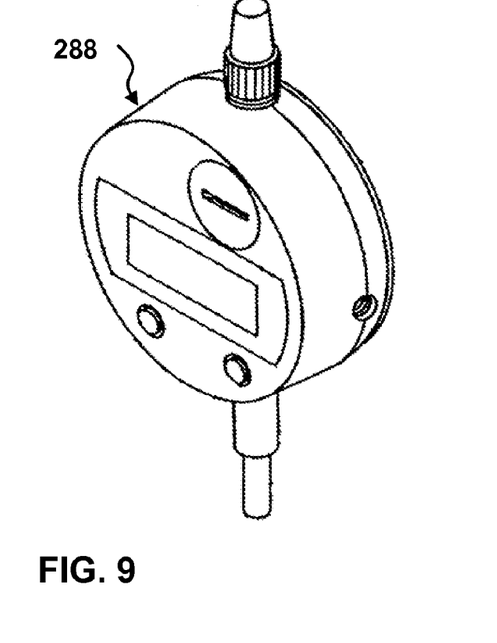
FIG. 9 shows a typical digital dial gauge (also a member of the group of products known as electronic indicators) which may be employed in place of the indicator of FIG. 7.
Figure 9A:
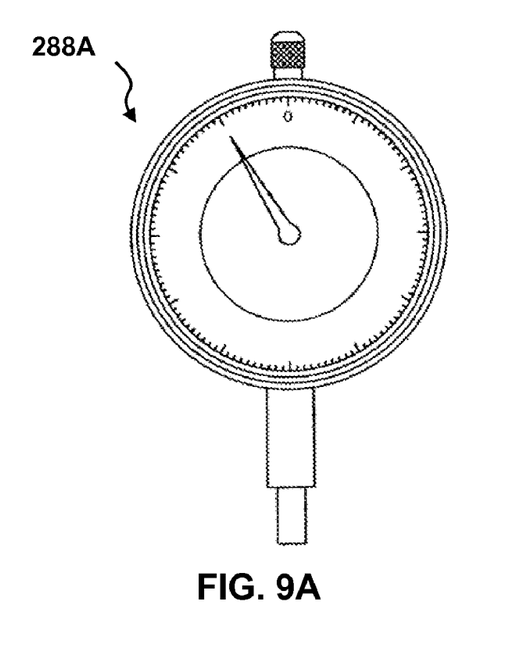
FIG. 9A shows a typical analog dial gauge (also known as a dial indicator) which may be employed in place of the indicator of FIG. 7.

Although a digital indicator 188 is shown as the distance displacement measurement gauge 188, an analog indicator could be substituted for measurement gauge 188. Likewise, a particular type of indicator, known as a dial gauge (digital or analog), could be substituted for the digital indicator 188. FIG. 9 shows a digital dial gauge 288. FIG. 9A shows an analog dial gauge 288A. The terms "indicator" and "gauge" are relatively interchangeable.

The term "indicator" and the term "dial gauge" (also known as a "dial gage") are terms of art. Indicators, and their subset dial gauges, have a gauge case comprising a case body, a stem extending from the case body and a spindle passed through an outer wall of the case body and supported to move in the axial direction through the stem which slidably holds the spindle. Typically the spindle extends from the stem. The outer wall comprises a front case member and a rear case member. The front case member is provided on the front of the case body and has a digital or analog indicator for indicating a moving linear displacement amount of the spindle. The rear case member is provided on the rear of the case body. The moving linear displacement of the spindle is indicated on the digital or analog indicator in directly readable numerals.

Figure 7:
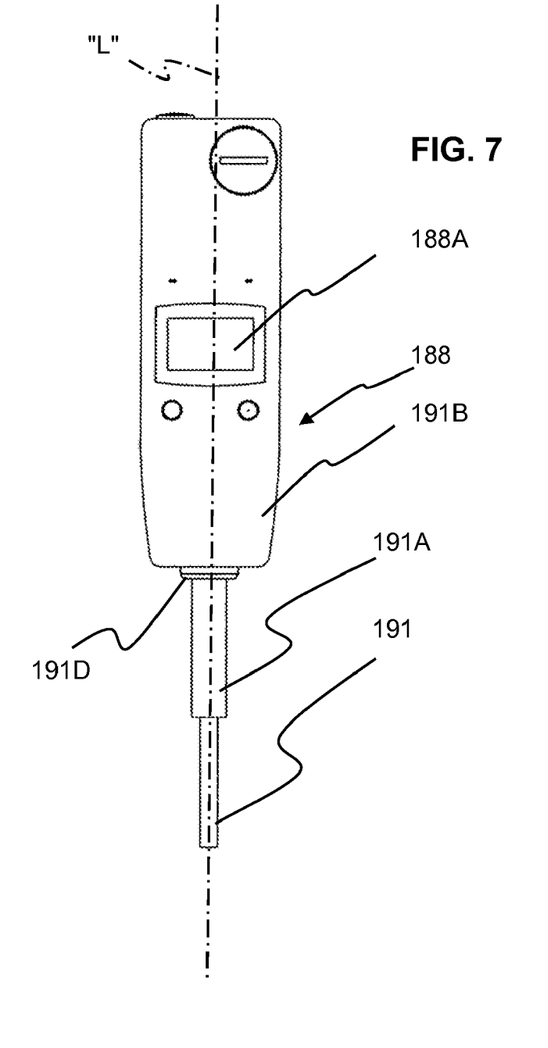
FIG. 7 is a front view of the indicator of the thickness gauge of FIG. 2 showing the vertically mounted measuring spindle.

The dial gauges are a type of indicator which tends to have a cylindrical case body with a outer circumferential wall, a front wall and a back wall, for example, as disclosed in U.S. Pat. No. 5,979,069, incorporated herein by reference, and either an analog or digital display. Mechanical dial gauges or indicators are almost always round (due to the need to have a needle for readouts). The digital gauges or indicators can be virtually any shape, but round or rectangular are common. For example, the indicators may have an elongate body and a digital display, as shown in FIG. 7. An electronic indicator is another term for a digital gauge or indicator.

A typical commercially available digital indicator 188 for use in the present invention is an IDU DIGIMATIC Indicator with ABSOLUTE ENCODER- Series 575 item #D-U1025E from Mitutoyo America Corporation of Aurora, Ill. 60502. This indicator has a measuring range (distance its spindle can retract of: 0-1 inch/0-25.4 mm) and an LCD Resolution of 0.0005 inch (0.01 mm) as well as an accuracy of 0.0008 inch, a quantizing error ±1 count, a measuring force (downward) of 1.8N or less, a stem diameter of about 0.375 +/−0.0012 inch, and DIGIMATIC data output. The indicator is battery powered so it is conveniently portable. Typical dial gauges are also available from Mitutoyo America Corporation.

FIG. 7 shows the indicator 188 has a body 191B, a vertically oriented spindle 191 and a hollow stem 191A all aligned along a longitudinal axis "L". The body 191B acts as a handle for the person using the device. The spindle 191 is slidably mounted within the hollow stem 191A to extend from the stem 191A. The hollow stem 191A is attached to the body 191B. The body 191B has a ring 191D about the opening of the body 191B from which the hollow stem 191A extends.

FIG. 9 shows a typical digital dial gauge (also a member of the group of products known as electronic indicators) which may be employed in place of the indicator of FIG. 7.

FIG. 9A shows a typical analog dial gauge (also known as a dial indicator) which may be employed in place of the indicator of FIG. 7.

Figure 3:
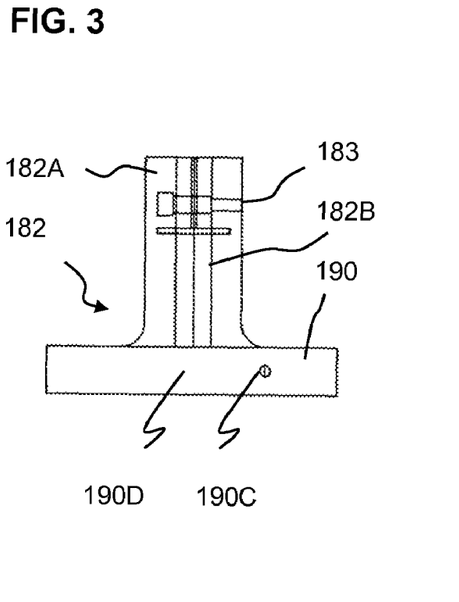
FIG. 3 is a cross-sectional side view of the gauge body of the thickness gauge of FIG. 1.

FIG. 3 shows the skirt 182 has a shaft 182A extending upwardly from a base 190. The skirt 182 has a central through-hole (borehole) 182B passing through the shaft 182A and base 190. For example, the skirt 182 has a through-hole 182B of sufficient diameter for locating the gauge hollow stem 191A within the through-hole 182 to be releasably slidably fixed such that, upon release, the shaft 191A may slide within the through-hole 182B. FIG. 1 shows the hollow stem 191A of the gauge 188 mounted within the skirt 182. The base 190 also has three bottom openings 190A on its lower wall 190B and three threaded side mounting holes 190C (one shown in FIG. 3) on its sidewall 190D. Each bottom opening 190A is respectively provided to communicate with one of the threaded side mounting holes 190C.

Typically the skirt 182, platen 184, spindle 191, hollow stem 191A, and legs 186 are made of metal, such as stainless steel, aluminum, or another material which can withstand contact with cementitious slurry. Typically the skirt 182 is made of aluminum, the legs 186 are made of steel, and the platen 184 is made of aluminum.

Figure 5:
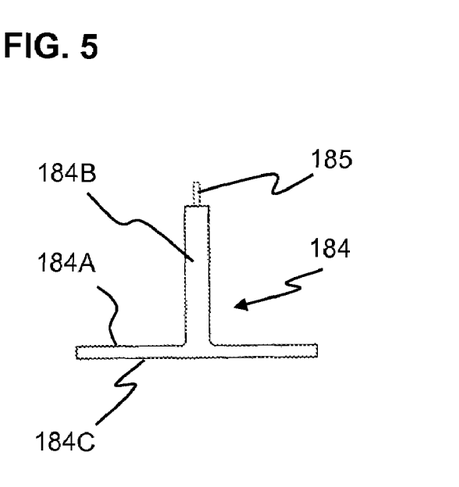
FIG. 5 is a side view of the measuring platen showing the screw point that is screwed into the gauge body shown in FIG. 2.

FIG. 5 shows the measuring platen 184 has a base 184A, a platen shaft 184B extending upwardly from the base 184A, and a threaded screw 185 extending from the end of the platen shaft 184B distal to the base 184A. For example, the screw 185 may be a threaded stainless steel stud.

Figure 8:
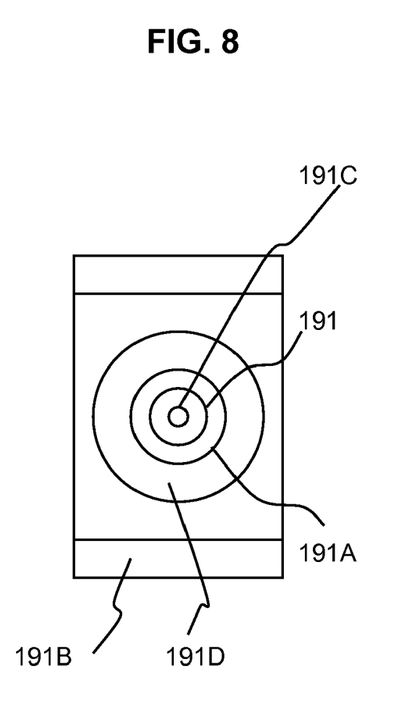
FIG. 8 shows a bottom view of the digital indicator (also a member of the group of products known as electronic indicators) of the thickness gauge of FIG. 2 showing the opening at the end of the vertically mounted measuring spindle.

FIG. 1 shows the point of contact of the upper end of the platen shaft 184B and the bottom end of the spindle 191. The threaded screw 185 at the upper end of the measuring platen 184 is attached to the bottom end of the spindle 191 by screwing the threaded screw 185 to a threaded opening 191C in the bottom of the spindle 191 (FIG. 8).

To assemble the wet slurry thickness gauge 188, the hollow shaft 191A is inserted through the borehole 182B of the flared skirt 182 (FIG. 1). Then the skirt 182 is attached to the hollow shaft 191A by means of the offset clamping screw 183. Thus, the skirt 182 encircles the perimeter of the sidewalls of the hollow shaft 191A along at least a portion of the length of the sidewalls of the hollow shaft 191A. Then the measuring platen 184 is attached to the spindle 191 by screwing the threaded screw 185 into the above-mentioned threaded opening 191C in the end of the spindle 191.

Figure 4:
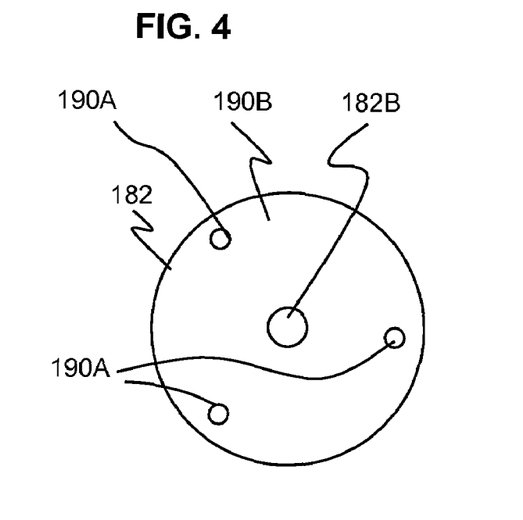
FIG. 4 is a bottom view of the gauge body of the thickness gauge of FIG. 1.

Then the support legs (also termed "pins") 186 are attached to the base 190 of the skirt 182. For example, the skirt 182 is fitted with pointed support legs 186, typically three in a tripod arrangement, disposed along the circumference of the bottom side 190B of the circular base 190. Each of the side mounting holes 190C communicates with a respective bottom hole 190A. Thus, the support legs 186 are retained in the holes 190A (FIG. 4) on the skirt bottom by three Allen screws screwed respectively into the threaded side mounting holes 190C on the outer perimeter surface of the sidewalls 190D of the base 190 of the skirt 182.

In a preferred embodiment, the holes 190A in which the legs 186 are mounted are not through-holes. The Allen screws in holes 190C now only retain the legs which bottom out in the blind holes. This arrangement makes it virtually impossible for the legs to move up during use and very unlikely the legs will move down during use (the Allen screws hold them). This allows for greater overall accuracy of the measurements of the gauge. This embodiment is not relying on the Allen screw to prevent the leg from moving up during use. The legs bottom out in the blind hole, making it virtually impossible for them the move up during use no matter how hard the user pushes down. The Allen screws function to keep the legs in place in the blind hole (a blind hole is a hole that is not a through hole) so that the do not fall out of the hole.

In contrast, if the legs were inserted into through holes and held in place merely by small Allen screws, then no matter how tight the user made the screws, it is possible for a user to put enough down pressure on the gauge to force the legs to move in the hole and protrude out the top of the skirt. (182).

In the alternative, if desired, the legs 186 may be attached to the skirt 182 before the platen 184 is attached to the spindle 191.

The spindle 191 and platen 184 when attached together form a probe extending from the stem 191A at least a sufficient length to permit the overall probe to travel at least the expected thicknesses desired to be measured.

Preferably the spindle 191 extends from the stem 191A to expose the distal end of the spindle 191 when the spindle 191 is an at rest position, as shown, for example, in FIG. 7. However, in an embodiment not shown, if a shorter spindle not extending beyond the stem is desired then a platen having a sufficiently long shaft to permit the overall probe to be able to travel at least the expected thicknesses desired to be measured may be employed to compensate for the shortness of such a spindle.

Figure 11:
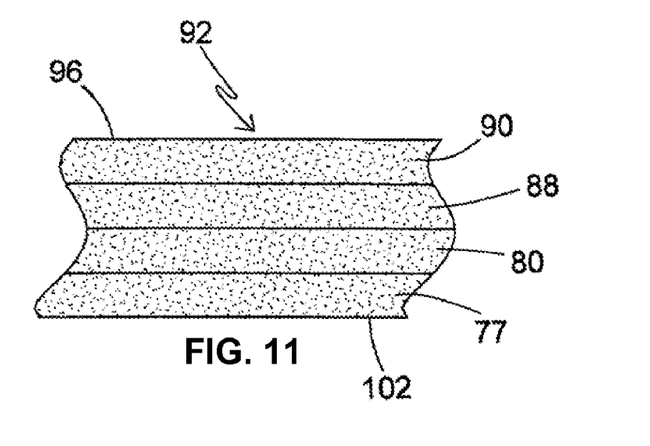
FIG. 11 is a fragmentary vertical section of a structural cementitious panel produced according to the present procedure.

The measuring platen 184 is designed to be placed on the top surface of a wet slurry layer to be measured, for example upper surface 96 of panel 92 prior to the setting of the panel 92 (FIG. 11). In operation, the three tripod pins 186 and the measuring platen 184 are placed on the top surface of the formed slurry. Then the thickness gauge 189 is pressed down to push the legs 186 into the slurry until the legs 186 rest on the support underlying the slurry while the bottom wall 184C of the platen 184 rests on the slurry surface. The pressure of the slurry layer on the bottom wall 184C of the measuring platen 184 will force the platen shaft 184B upwards to push the measuring spindle 191 upwards. Then the measurement of distance the platen has been pushed upwards is registered on the digital display 188A of gauge 189 to show the thickness of the slurry. This operation is repeated over the entire cross section of the slurry to determine if there is any significant variation in the thickness of the slurry layer.

Figure 6:
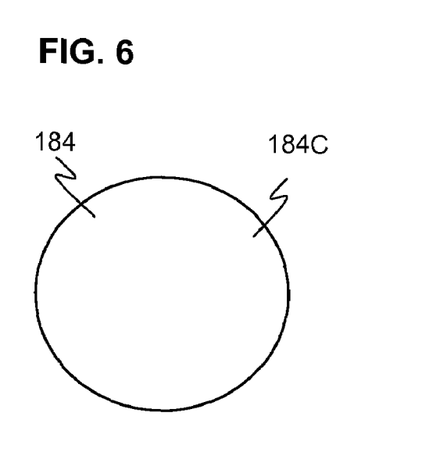
FIG. 6 is a bottom view of the measuring platen showing the screw point that is screwed into the gauge body shown in FIG. 2.

Thus, the measuring platen 184 has a bottom wall 184C of sufficient area to distribute the pressure, from the downwards biasing of the spindle exerted through the platen, plus the weight of the platen, such that the platen bottom wall 184 is able to rest on the slurry surface without penetrating significantly into the slurry surface during use. Thus, typically the bottom wall 184C is flat. A typical range of diameter of the bottom wall 184C is 1.5 to about 3.5 inches (3.8 to 8.9 cm). Although FIG. 6 shows bottom wall 184C as circular, and a circular shape is preferred, other shapes may be employed.

Prior to use the gauge 189 is zeroed as follows. While the digital indicator 188, skirt 182, platen 184 and legs 185 of the wet slurry thickness gauge 189 are already assembled together, and the spindle 191 is fully extended, the clamping screw 183 is loosened. In particular, the clamping screw 183 is sufficiently loose to permit the vertical hollow shaft 191A of the digital gauge 188 to be moved up and down in the borehole 182B of the skirt 182 until the gauge 188A is zeroed. Then the clamping screw 183 is tightened. This initial setting eliminates the need to "zero" the gauge 189 prior to each use. When adjusted in this way, the gauge 189 will always read zero or very close to zero when the tripod pins and the measurement platen are touching the same flat surface. This ability to move the skirt 182 permits resetting the gauge to zero if the platen 184 is replaced by another platen of different length.

If desired, a center mounted clamping screw could be used to hold the skirt in place instead of the offset clamping screw 183. Also, if desired, the tripod pins may be permanently mounted to the gauge skirt rather than being removably mounted by Allen screws in threaded side mounting holes 190C.

Figure 9B:
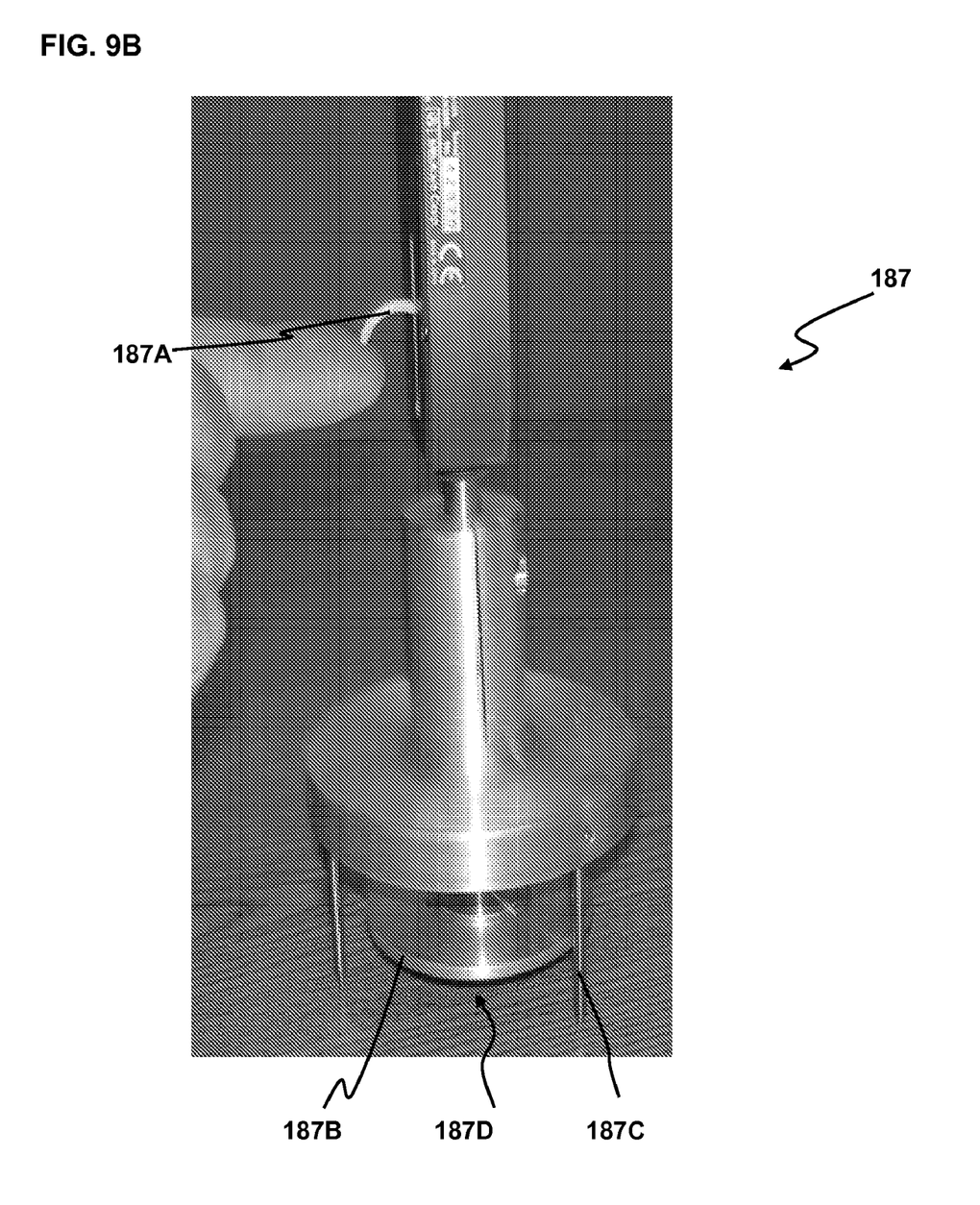
FIG. 9B shows another embodiment of the thickness measuring gauge having a manual lever.

However, a preferred way to use the thickness measuring gauge is to employ another embodiment of the thickness measuring gauge 187 (FIG. 9B) which is the same or similar to the gauge 189 except for having a lever 187A extending from its rear wall. The lever 187 is manually pulled up to pull up the platen 187B. Then the thickness measuring gauge 187 is placed over the top surface of the formed slurry. Then the thickness measuring gauge 187 is pressed down to push the legs 187C into the slurry until the legs 187C rest on the support underlying the slurry. Then the bottom wall of the platen 187A is lowered until it rests on the slurry surface. Then the measurement of the difference in height of the bottom wall 187D of the platen 187A and the distal ends of the legs is registered on the digital display of the gauge 189 to show the thickness of the slurry. This operation is repeated over the entire cross section of the slurry to determine if there is any significant variation in the thickness of the slurry layer.

Typical Production Line in which the Thickness Gauge may be Used

Figure 10:
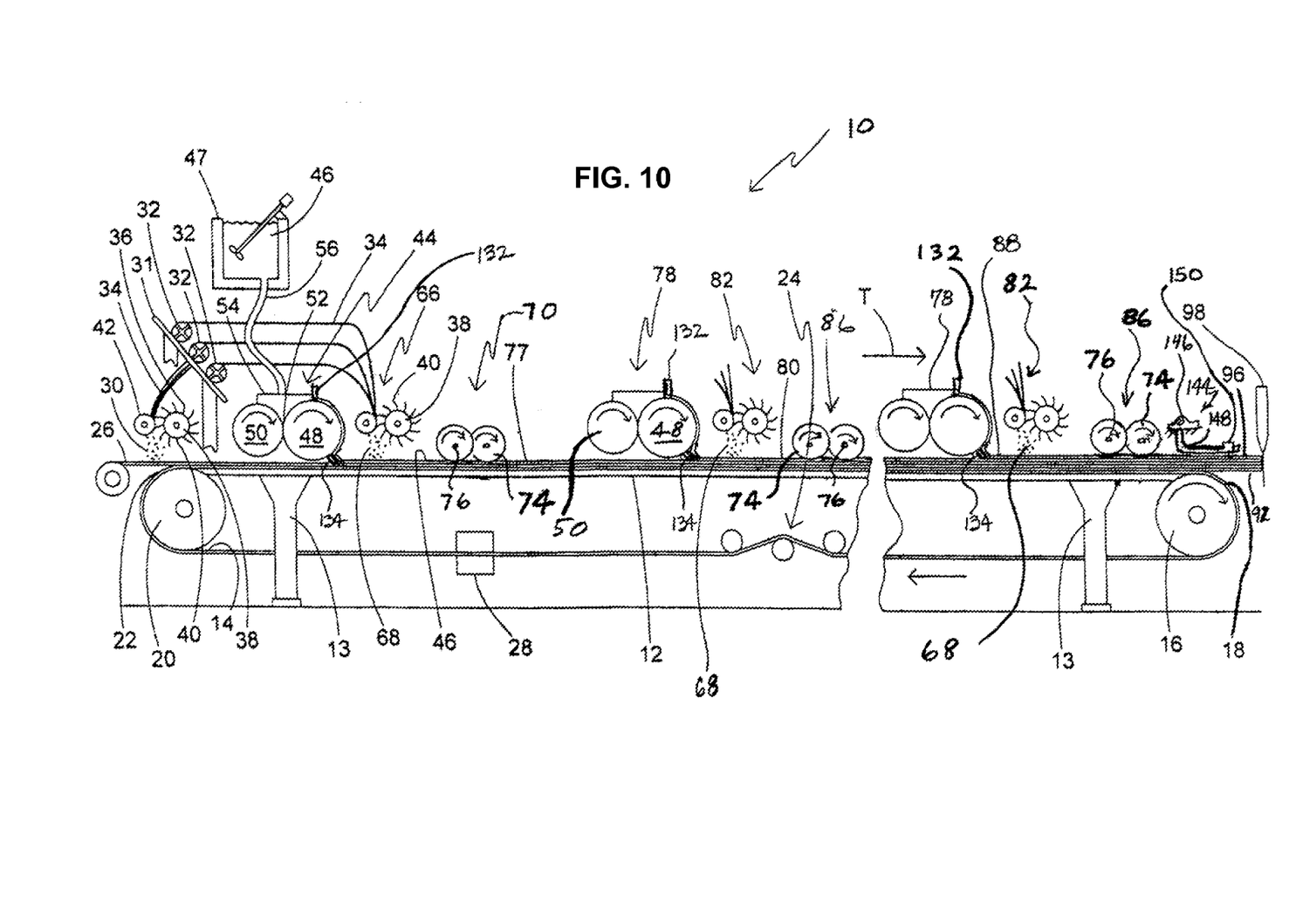
FIG. 10 is a diagrammatic elevational view of an SCP panel production line suitable for use with the present thickness gauge.

Referring now to FIG. 10, a structural panel production line is diagrammatically shown and is generally designated 10. The gauge of the present invention is useful for measuring thickness of the SCP slurry at various locations along the production line prior to the setting of the slurry.

The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13 or other support structure. The support frame 12 also includes a main drive roll 16 at a distal end 18 of the frame, and an idler roll 20 at a proximal end 22 of the frame. Also, at least one belt tracking and/or tensioning device 24 is typically provided for maintaining a desired tension and positioning of the carrier 14 upon the rolls 16, 20. In this embodiment, the SCP panels are produced continuously as the moving carrier proceeds in a direction "T" from the proximal end 22 to the distal end 18.

In this embodiment, a web 26 of Kraft paper, release paper, or a plastic carrier, for supporting a slurry prior to setting, may be provided and laid upon the carrier 14 to protect it and/or keep it clean.

However, it is also contemplated that, rather than the continuous web 26, individual sheets (not shown) of a relatively rigid material, e.g., sheets of polymer plastic, may be placed on the carrier 14.

It is also contemplated that the SCP panels produced by the present line 10 are formed directly upon the carrier 14. In the latter situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 may vary to suit the product being made.

Structural cement panel (SCP panel) production is initiated by depositing a layer of loose, chopped fibers 30 of about one inch in size upon a plastic carrier on the web 26. A variety of fiber depositing and chopping devices are contemplated by the present line 10. For example, a typical system employs a rack 31 holding several spools 32 of fiberglass cord, from each of which a length or string 34 of fiber is fed to a chopping station or apparatus, also referred to as a chopper 36. Typically a number of strands of fiberglass are fed at each of the chopper stations.

The chopper 36 includes a rotating bladed roll 38 from which project radially extending blades 40 extending transversely across the width of the carrier 14, and which is disposed in close, contacting, rotating relationship with an anvil roll 42. In the preferred embodiment, the bladed roll 38 and the anvil roll 42 are disposed in relatively close relationship such that the rotation of the bladed roll 38 also rotates the anvil roll 42, however the reverse is also contemplated. Also, the anvil roll 42 is preferably covered with a resilient support material against which the blades 40 chop the cords 34 into segments. The spacing of the blades 40 on the roll 38 determines the length of the chopped fibers. As is seen in FIG. 10, the chopper 36 is disposed above the carrier 14 near the proximal end 22 to maximize the productive use of the length of the production line 10. As the fiber strands 34 are chopped, the fibers fall loosely upon the carrier web 26.

Slurry Mixer

The present production line 10 includes a slurry feed station or slurry feeder or slurry headbox, generally designated 44 and a source of slurry, which in this embodiment is a wet mixer 47. The slurry feeder 44 receives a supply of slurry 46 from the wet mixer 47 for depositing the slurry 46 on chopped fibers on the carrier web 26. It is also contemplated that the process may begin with the initial deposition of slurry upon the carrier 14.

While a variety of settable slurries are contemplated, the present process is particularly designed for producing structural cement panels (SCP panels). As such, the slurry 46 is preferably comprised of varying amounts of Portland cement, gypsum, aggregate, water, accelerators, plasticizers, foaming agents, fillers and/or other ingredients well known in the art, and described in the patents listed below which have been incorporated by reference. The relative amounts of these ingredients, including the elimination of some of the above or the addition of others, may vary to suit the intended use of the final product.

U.S. Pat. No. 6,620,487 to Tonyan et al., incorporated herein by reference in its entirety, discloses a reinforced, lightweight, dimensionally stable structural cement panel (SCP) which employs a core of a continuous phase resulting from the curing of an aqueous mixture of calcium sulfate alpha hemihydrate, hydraulic cement, an active pozzolan and lime. The continuous phase is reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the SCP panels may include a cured continuous phase reinforced with glass fibers and containing sufficient polymer spheres to improve nailability or made with a water-to-reactive powders ratio to provide an effect similar to polymer spheres, or a combination thereof.

If desired the composition may have a weight ratio of water-to-reactive powder of 0.4/1 to 0.7/1.

Various formulations for the composite slurry used in the current process are also shown in published US applications US2006/185267, US2006/0174572; US2006/0168905 and US 2006/0144005, all of which are incorporated herein by reference in their entirety. A typical formulation would comprise as the reactive powder, on a dry basis, 35 to 75 wt. % calcium sulfate alpha hemihydrate, 20 to 55 wt. % hydraulic cement such as Portland cement, 0.2 to 3.5 wt. % lime, and 5 to 25 wt. % of an active pozzolan. The continuous phase of the panel would be uniformly reinforced with alkali-resistant glass fibers and would contain 20-50% by weight of a uniformly distributed lightweight filler particles selected from the group consisting of ceramic microspheres, glass microspheres, fly ash cenospheres and perlite. Although the above compositions for the SCP panels are preferred, the relative amounts of these ingredients, including the elimination of some of the above or the addition of others, may vary to suit the intended use of the final product.

Embodiments of the slurry mixer 47 are explained in greater detail in U.S. patent application Ser. No. 11/555,647, entitled METHOD FOR WET MIXING CEMENTITIOUS SLURRY FOR FIBER-REINFORCED STRUCTURAL CEMENT PANELS and U.S. patent application Ser. No. 11/555,658, entitled APPARATUS AND METHOD FOR WET MIXING CEMENTITIOUS SLURRY FOR FIBER-REINFORCED STRUCTURAL CEMENT PANELS both filed concurrently with the present application and incorporated herein by reference in their entirety.

Slurry Feed Apparatus

Referring now to FIG. 10, as mentioned above, the present slurry feed apparatus, also referred to as a slurry feed station, a slurry feeder or slurry headbox, generally designated 44 receives a supply of slurry 46 from the wet mixer 47.

The preferred slurry feeder 44 includes a main metering roll 48 disposed transversely to the direction of travel "T" of the carrier 14. A companion or back up roll 50 is disposed in close, parallel, rotational relationship to the metering roll 48. Slurry 46 is deposited in a first nip 52 between the two rolls 48, 50.

The slurry feeder 44 also has a gate 132 mounted to sidewalls 54 of the slurry feed apparatus 44 to be mounted adjacent to the surface of the metering roll 48 to form a second nip between the gate 132 and an upper portion of the roll 48. The rolls 48, 50 and gate 132 are disposed in sufficiently close relationship that the second nip retains a supply of the slurry 46, at the same time the rolls 48, 50 rotate relative to each other. The gate 132 is provided with a vibrator (not shown) functionally attached to the gate 132. The metering roll 48 rotates from the first nip 52 to the second nip.

While other sizes are contemplated, typically the metering roll 48 has a larger diameter than the companion roll 50. Also, typically one of the rolls 48, 50 has a smooth, stainless steel exterior, and the other, preferably the companion roll 50, has a resilient, non-stick material covering its exterior.

The gate 132 may be mounted to the sidewalls 54 of the headbox 44 by a support system (not shown) to permit the position of the blade to be adjusted the horizontally, vertically as well. The vibrating gate 132 helps to prevent significant build-up of slurry 46 on the gate 132 and controls the thickness of the slurry 46 deposited on the metering roll 48. The vibrating gate 132 can easily be removed from the wall mounts for cleaning and maintenance.

The slurry feeder 44 deposits an even layer of the slurry 46 of relatively controlled thickness upon the moving carrier web 26. Suitable layer thicknesses range from about 0.08 inch to 0.16 inch (0.2 to 0.4 cm) However, with four layers preferred in the structural panel produced by the production line 10, and a suitable building panel being approximately 0.5 inch (1.27 cm) an especially preferred slurry layer thickness is in the range of 0.125 inch (0.32). However, for a target panel forming thickness is about 0.84 inch (2.1 cm), the standard layer thickness is typically closer to about 0.21 inches at each of the 4 forming stations. A range of 0.1 inch to 0.3 inch (0.25 to 0.76 cm) per headbox may also be suitable.

Thus, the relative distance between the vibrating gate 132 and the main metering roll 48 may be adjusted to vary the thickness of the slurry 46 deposited. The nip distance between the gate 132 and the metering roll 48 is typically maintained at a distance of about ⅛ to about ⅜ inches (about 0.32 to about 0.95 cm). However, this can be adjusted based upon the viscosity and thickness of the slurry 46 and the desired thickness of the partially dewatered slurry to be deposited on the web 26.

To ensure a uniform disposition of the slurry 46 across the entire web 26, the slurry 46 is delivered to the slurry feeder 44 through a hose 56 or similar conduit having a first end in fluid communication with the outlet of the slurry mixer or reservoir 47. A second end of the hose 56 is connected to a laterally reciprocating, cable driven, fluid-powered dispenser (not shown) of the type well known in the art. Slurry flowing from the hose 56 is thus poured into the feeder 44 in a laterally reciprocating motion to fill a reservoir defined by the rolls 48, 50 and the sidewalls 54 of the slurry feeder 44. Rotation of the metering roll 48 draws a layer of slurry 46 from the reservoir between the rolls 48, 50.

The reciprocating dispensing mechanism 64 is explained in greater detail in U.S. patent application Ser. No. 11/555,647, entitled PROCESS AND APPARATUS FOR FEEDING CEMENTITIOUS SLURRY FOR FIBER-REINFORCED STRUCTURAL CEMENT PANELS, filed concurrently with the present application and incorporated herein by reference in its entirety as well as U.S. Pat. No. 6,986,812 to Dubey et al. incorporated herein by reference in its entirety.

Another feature of the present feeder apparatus 44 is that the main metering roll 48 and the companion roll 50 are both driven in the same direction which minimizes the opportunities for premature setting of slurry on the respective moving outer surfaces. A drive system (not shown), including a fluid-powered, electric or other suitable motor is connected to the main metering roll 48 or the companion roll 50 for driving the roll(s) in the same direction, which is clockwise when viewed in FIG. 10. As is well known in the art, either one of the rolls 48, 50 may be driven, and the other roll may be connected via pulleys, belts, chain and sprockets, gears or other known power transmission technology to maintain a positive and common rotational relationship.

The slurry feeder 44 also has a doctor blade 134 located between the main metering roll 48 and the carrier web 26 to ensure that the relatively thin slurry 46 is completely deposited as a continuous curtain or sheet of slurry is uniformly directed down to within a distance of about 1.0 to about 1.5 inches (2.54 to 3.81 cm.) of the carrier web 26. The doctor blade 134 ensures the slurry 46 uniformly covers the fiber-glass fiber layer upon the carrier web 26 and does not proceed back up toward the nip 52. The doctor blade 134 also helps keep the main metering roll 50 free of prematurely setting slurry 46. The doctor blade 134 is mounted on a doctor blade support shaft (not shown) mounted on a doctor blade tension arm pivotably mounted to adjustable pivot mount attached to the support frame or sidewall 54 of the slurry feeder 44. The position of the doctor blade 134 can be adjusted by adjusting the adjustable pivot mount attached to the support frame or sidewall 54 of the slurry feeder 44.

Additional details of the slurry feeder (headbox) 44, vibrating gate 132 and doctor blade 134 are disclosed in U.S. patent application Ser. No. 11/555,647, entitled PROCESS AND APPARATUS FOR FEEDING CEMENTITIOUS SLURRY FOR FIBER-REINFORCED STRUCTURAL CEMENT PANELS, filed concurrently with the present application and incorporated herein by reference in its entirety.

Processing Downstream of the Slurry Feed Aparatus

Referring again to FIG. 10, the other operational components of the SCP panel production line will be described briefly, but they are described in more detail in the following documents:

U.S. Pat. No. 6,986,812 to Dubey et al., entitled SLURRY FEED APPARATUS FOR FIBER-REINFORCED STRUCTURAL CEMENTITIOUS PANEL PRODUCTION, herein incorporated by reference in its entirety; and the following co-pending, commonly assigned, United States patent applications all herein incorporated by reference in their entirety:

United States Patent Application Publication No. 2005/0064164 A1 to Dubey et al., application Ser. No. 10/666,294, entitled, MULTI-LAYER PROCESS AND APPARATUS FOR PRODUCING HIGH STRENGTH FIBER-REINFORCED STRUCTURAL CEMENTITIOUS PANELS;

United States Patent Application Publication No. 2005/0064055 A1 to Porter, application Ser. No. 10/665,541, entitled EMBEDMENT DEVICE FOR FIBER-ENHANCED SLURRY;

U.S. patent application Ser. No. 11/555,647, entitled PROCESS AND APPARATUS FOR FEEDING CEMENTITIOUS SLURRY FOR FIBER-REINFORCED STRUCTURAL CEMENT PANELS, filed concurrently with the present application;

U.S. patent application Ser. No. 11/555,655, entitled METHOD FOR WET MIXING CEMENTITIOUS SLURRY FOR FIBER-REINFORCED STRUCTURAL CEMENT PANELS, filed concurrently with the present application;

U.S. patent application Ser. No. 11/555.658, entitled APPARATUS AND METHOD FOR WET MIXING CEMENTITIOUS SLURRY FOR FIBER-REINFORCED STRUCTURAL CEMENT PANELS, filed concurrently with the present application;

U.S. patent application Ser. No. 11/555,661, entitled PANEL SMOOTHING PROCESS AND APPARATUS FOR FORMING A SMOOTH CONTINUOUS SURFACE ON FIBER-REINFORCED STRUCTURAL CEMENT PANELS, filed concurrently with the present application;

U.S. patent application Ser. No. 11/591,793, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed concurrently with the present application; and U.S. patent application Ser. No. 11/591,957, entitled EMBEDMENT ROLL DEVICE, filed concurrently with the present application.

Embedment Device

While a variety of embedment devices are contemplated, including, but not limited to vibrators, sheep's foot rollers and the like, in the present embodiment of the embedment device 70 includes at least a pair of generally parallel shafts 76 mounted transversely to the direction of travel of the carrier web 14 on the frame 12. Each shaft 76 is provided with a plurality of relatively large diameter disks 76 which are axially separated from each other on the shaft by small diameter disks (not shown).

During SCP panel production, the shafts 76 and the disks 74 rotate together about the longitudinal axis of the shaft 76. As is well known in the art, either one or both of the shafts 76 may be powered, and if only one is powered, the other may be driven by belts, chains, gear drives or other known power transmission technologies to maintain a corresponding direction and speed to the driven shaft. The respective disks 74 of the adjacent, preferably parallel shafts 76 overlap and are intermeshed with each other for creating a "kneading" or "massaging" action in the slurry, which embeds the previously deposited fibers 68. In addition, the close, intermeshed and rotating relationship of the disks 74 prevents the buildup of slurry 46 on the disks, and in effect creates a "self-cleaning" action which significantly reduces production line downtime due to premature setting of clumps of slurry.

Embodiments of embedment device 70 suitable for use in production line 10 are disclosed in greater detail in co-pending U.S. patent application Ser. No. 10/665,541, filed Sep. 18, 2003, published as US 2005/0064055, and entitled EMBEDMENT DEVICE FOR FIBER-ENHANCED SLURRY, U.S. patent application Ser. No. 11/591,793, filed concurrently with the present application, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT and U.S. patent application Ser. No. 11/591,957, entitled EMBEDMENT ROLL DEVICE, filed concurrently with the present application; all incorporated herein by reference in their entirety.

Applying Additional Layers

Once the fiber 68 has been embedded, a first layer 77 of the panel 92 is complete. In a preferred embodiment, the height or thickness of the first layer 77 is in the approximate range of 0.05 to 0.15 inches. This range has been found to provide the desired strength and rigidity when combined with like layers in a SCP panel. However other thicknesses are contemplated depending on the final intended use of the SCP panel.

To build a structural cementitious panel of desired thickness, additional layers are typically added. To that end, a second slurry feeder 78, which is substantially identical to the feeder 44, is provided in operational relationship to the moving carrier 14, and is disposed for deposition of an additional layer 80 of the slurry 46 upon the existing layer 77.

Next, an additional chopper 82, substantially identical to the choppers 36 and 66, is provided in operational relationship to the frame 12 to deposit a third layer of fibers 68 provided from a rack (not shown) constructed and disposed relative to the frame 12 in similar fashion to the rack 31. The fibers 68 are deposited upon the slurry layer 80 and are embedded using a second embedment device 86. Similar in construction and arrangement to the embedment device 70, the second embedment device 86 is mounted slightly higher relative to the moving carrier web 14 so that the first layer 77 is not disturbed. In this manner, the second layer 80 of slurry and embedded fibers is created.

Referring now to FIG. 10, with each successive layer of settable slurry and fibers, an additional slurry feeder station 78 followed by a fiber chopper 82 and an embedment device 86 is provided on the production line 10. In the preferred embodiment, four total layers 77, 80, 88, 90 are provided to form the SCP panel 92.

The panel 92 has multiple layers 77, 80, 88, 90 (FIG. 11) which upon setting, form an integral, fiber-reinforced mass. Provided that the presence and placement of fibers in each layer are controlled by and maintained within certain desired parameters as is disclosed and described herein, it will be virtually impossible to delaminate the panel 92 produced by the present process.

Forming and Smoothing and Cutting

Upon the disposition of the four layers of fiber-embedded settable slurry as described above, a forming device may provided to the frame 12 to shape an upper surface 96 of the panel 92.

However, forming devices which scrape away excess thickness of SCP panel material are not desired. For example, forming devices such as spring-loaded or vibrating plates or vibrating leveling screeds which are designed to conform the panel to suit desired dimensional characteristics are not used with SCP material since they scrape away excess thickness of SCP panel material are not employed. Such devices would not effectively scrape away or flatten the panel surface. They would cause the fiberglass to begin to roll up and mar the surface of the panel instead of flattening and smoothing it.

In particular, the production line 10 may include a smoothing device or vibrating shroud 144 provided to the frame 12 to gently smooth an upper surface 96 of the panel 92. The smoothing device 144 includes a mounting stand 146, a flexible sheet 148 secured to the mounting stand, and a vibration generator (vibrator) 150 preferably located on the stiffening member to cause the sheet 148 to vibrate. The sheet has an upstream end pivotally attached to mount 146 on the production line 10 and a curved panel which has a trailing downstream end which contacts the topmost layer of the SCP material passing underneath it. If desired the smoothing device 144 is provided with weights 159 to assist in smoothing the surface of the topmost layer of slurry. The smoothing device 144 may be provided after the last embedment station 86 or respective shrouds may be provided after each embedment station 70, 86.

The smoothing device or shroud 144 is explained in greater detail in U.S. patent application Ser. No. 11/555,661, entitled PANEL SMOOTHING PROCESS AND APPARATUS FOR FORMING A SMOOTH CONTINUOUS SURFACE ON FIBER-REINFORCED STRUCTURAL CEMENT PANELS, filed concurrently with the present application and incorporated herein by reference in its entirety.

Other forming devices are contemplated as otherwise known in the art. However, the smoothing device 144 advantageously avoids disrupting or tearing portions of the SCP panel from carrier web 26. Forming devices that scrape away excess SCP material are not employed because they disrupt or tear the SCP material due to the fibrous nature of the panel product as it is being formed.

At this point, the layers of slurry have begun to set, and the respective panels 92 are separated from each other by a cutting device 98, which in a typical embodiment is a water jet cutter. Other cutting devices, including moving blades, are considered suitable for this operation, provided they can create suitably sharp edges in the present panel composition. The cutting device 98 is disposed relative to the line 10 and the frame 12 so that panels are produced having a desired length, which may be different from the representation shown in FIG. 10. Since the speed of the carrier web 14 is relatively slow, the cutting device 98 may be mounted to cut perpendicularly to the direction of travel of the web 14. With faster production speeds, such cutting devices are known to be mounted to the production line 10 on an angle to the direction of web travel. Upon cutting, the separated panels 92 are stacked for further handling, packaging, storage and/or shipment as is well known in the art.

The production line 10 includes sufficient fiber chopping stations 36, 66, 82, slurry feeder stations 44, 78 and embedment devices 70, 86 to produce at least four layers 77, 80, 88 and 90 (FIG. 11). Additional layers may be created by repetition of stations as described above in relation to the production line 10.

Upon creation of the SCP panels 92, an underside 102 or bottom face of the panel may be smoother than the upper side or top face 96, even after being engaged by the forming device 94. In some cases, depending on the application of the panel 92, it may be preferable to have a smooth face and a relatively rough face. However, in other applications, it may be desirable to have a board in which both faces 96, 102 are smooth. The smooth texture is generated by the contact of the slurry with the smooth carrier 14 or the carrier web 26.

To obtain a SCP panel with both faces or sides smooth, both upper and lower faces 96, 102 may be formed against the carrier 14 or the release web 26 as disclosed by U.S. patent application Ser. No. 11/591,957entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed concurrently with the present application.

Another alternative (not shown) is to sand one or both faces or sides 96, 102.

The resulting SCP panel 92 is constructed so that the fibers 30, 68 are uniformly distributed throughout the panel. This has been found to enable the production of relatively stronger panels with relatively less, more efficient use of fibers. The volume fraction of fibers relative to the volume of slurry in each layer preferably constitutes approximately in the range of 1% to 5% by volume, preferably 1.5% to 3% by volume, of the slurry layers 77, 80, 88, 90. If desired, the outer layers 77, 90 may have a higher volume fraction that either or both of inner layers 80, 88.

Second Embodiment of a Production Line

Figure 12:
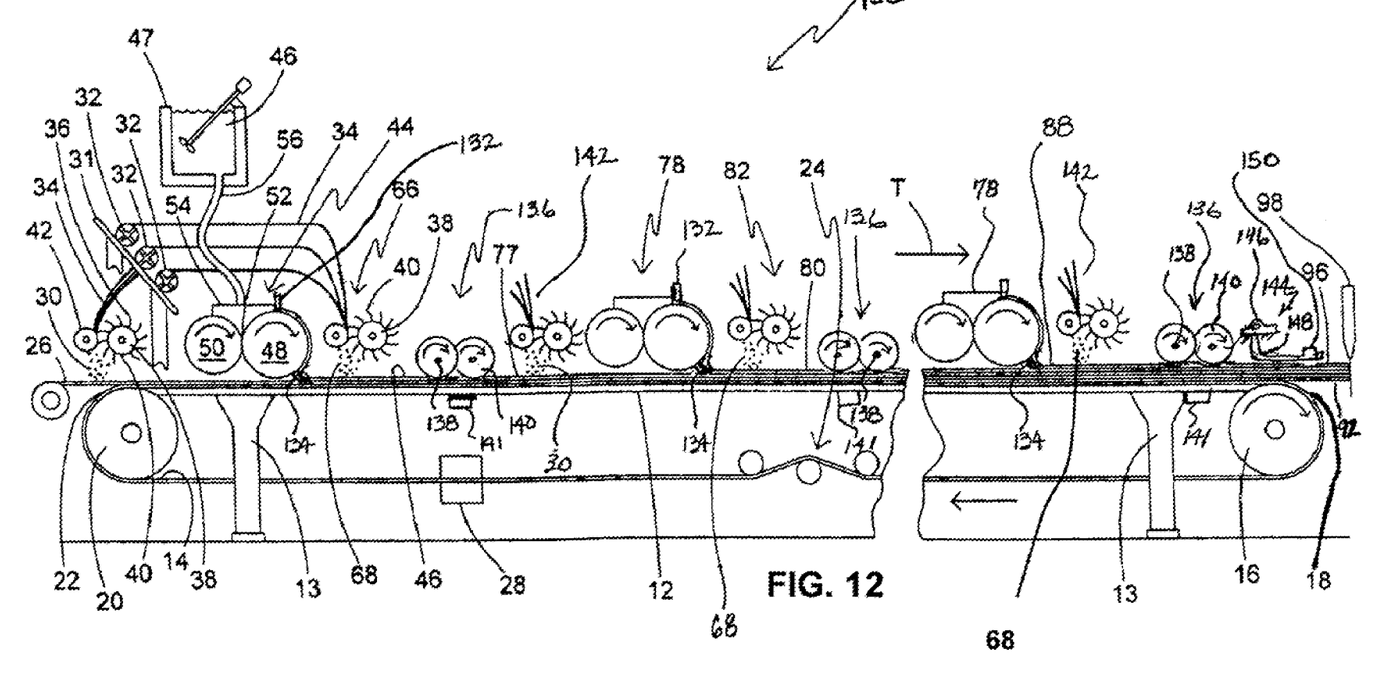
FIG. 12 is a diagrammatic elevational view of a second embodiment of an SCP panel production line suitable for use with the present thickness gauge.

The present metering gauge may also be used with an alternate SCP panel production line or system 130 illustrated in FIG. 12 and generally designated 130 for producing high-performance, fiber reinforced SCP panels incorporating a relatively high volume of fibers per slurry layer.

In many cases, increased levels of fibers per panel are obtained using this system. While the system of FIG. 10 discloses depositing a single discrete layer of fibers into each subsequent discrete layer of slurry deposited after the initial layer, the production line 130 includes a method of building up multiple discrete reinforcing fiber layers in each discrete slurry layer to obtain the desired panel thickness. Most preferably, the disclosed system embeds at least two discrete layers of reinforcing fibers, in a single operation, into an individual discrete layer of slurry. The discrete reinforcing fibers are embedded into the discrete layer of slurry using a suitable fiber embedment device.

More specifically, in FIG. 12 components used in the system 130 and shared with the system 10 of FIG. 10 are designated with identical reference numbers, and the above description of those components is considered applicable here. Furthermore, it is contemplated that the apparatus described in relation to FIG. 12 may be combined with that of FIG. 10 in a retrofit manner or be a new construction.

It is also contemplated that the system 130 of FIG. 12 may be provided with the upper deck 106 of U.S. patent application Ser. No. 11/591,957,entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed concurrently with the present application.

In the alternate system 130, SCP panel production is initiated by depositing a first layer of loose, chopped fibers 30 upon the web 26. Next, the slurry feed station, or the slurry feeder 44 receives a supply of slurry 46 from the remote mixer 47.

It is contemplated that the mixer 47, slurry 46, and slurry feeder 44 in this embodiment are the same as that used in the production line 10 of FIG. 10.

Suitable layer thicknesses range from about 0.05 inch to 0.35 inch (0.13 to 0.9 cm). For instance, for manufacturing a nominal ¾ inch (1.9 cm) thick structural panel, four layers are preferred with an especially preferred slurry layer thickness less than approximately 0.25 inch (0.64 cm) in the preferred structural panel produced by the present process.

The slurry 46 is delivered to the feeder 44 through the hose 56 as in the production line 10 of FIG. 10. Rotation of the metering roll 48 thus draws a layer of the slurry 46 from the reservoir between rolls 48, 50.

The system 130 is preferably provided with the above-described vibrating gate 132 and the above-described spring biased doctor blade 134.

A second chopper station or apparatus 66, preferably identical to the chopper 36, is disposed downstream of the feeder 44 to deposit a second layer of fibers 68 upon the slurry 46. The chopper apparatus 66 may be fed cords 34 from the same rack 31 that feeds the chopper 36. However, it is contemplated that separate racks 31 could be supplied to each individual chopper.

Referring again to FIG. 12, next, an embedment device, generally designated 136, is disposed in operational relationship to the slurry 46 and the moving carrier 14 of the production line 130 to embed the first and second layers of fibers 30, 68 into the slurry 46. While a variety of embedment devices are contemplated, including, but not limited to vibrators, sheep's foot rollers and the like, in the preferred embodiment, the embedment device 136 is similar to the embedment device 70 with the exception that the overlap of the adjacent shafts 138 have been decreased to the range of approximately 0.5 inch. Also, the number of disks 140 has been reduced, and the disks are substantially thicker. In addition, there is a tighter spacing or clearance between adjacent overlapping disks 140 of adjacent shafts 138, on the order of 0.010 to 0.018 inches (0.0254 to 0.0457 cm), to prevent fibers from becoming lodged between adjacent disks.

Further details of the embedment device 136 are found in co-pending, commonly assigned U.S. patent application Ser. No. 11/591,957, entitled EMBEDMENT ROLL DEVICE which is incorporated by reference. Otherwise, the embedment device 136 provides the same sort of kneading action as the device 70, with the objective of embedding or thoroughly mixing the fibers 30, 68 within the slurry 46.

If desired to further enhance the embedment of the fibers 30, 68 into the slurry 46, at each embedment device 136 the frame 12 is provided with at least one vibrator 141 in operational proximity to the carrier web 14 or the paper web 26 to vibrate the slurry 46. Such vibration has been found to more uniformly distribute the chopped fibers 30, 68 throughout the slurry 46. Conventional vibrator devices are deemed suitable for this use.

As seen in FIG. 12, to implement the present system 130 of multiple layers of fibers 30, 68 for each layer of slurry 46, additional chopping stations 142 are provided between the embedment device 136 and subsequent slurry feeder boxes 78, so that for each layer of slurry 46, fibers 30, 68 are deposited before and after deposition of the slurry. In the preferred embodiment, while only three are shown, four total layers of combined slurry and fiber are provided to form the SCP panel 92.

Upon the disposition of the four layers of fiber-embedded settable slurry as described above, a forming device such as the smoothing device, also termed a vibrating shroud 144 is preferably provided to the frame 12 to shape or smooth an upper surface 96 of the panel 92.

Other forming devices are contemplated, as are described above and otherwise known in the art.

If desired the amount of fibers deposited in the above production line 130 may be controlled in a process comprising:

using a first formula:

$$S_{f1,i}^P = \frac{4V_{f,i}t_i}{\pi(1+X_f)d_f}$$

for determining a projected fiber surface area fraction of a first fiber layer to be deposited in each settable slurry layer of the resulting panel;

using a second formula:

$$S_{f2,i}^P = \frac{4X_f V_{f,i}t_i}{\pi(1+X_f)d_f}$$

for determining a projected fiber surface area fraction of a second fiber layer to be deposited in each settable slurry layer of the resulting panel;

providing a desired slurry volume fraction $V_f$ of a percentage of the fibers in the fiber-reinforced slurry layer;

adjusting at least one of the fiber diameter $d_f$, and a fiber-reinforced slurry layer thickness $t_i$ in the range of 0.05-0.35 inches, and further apportioning the volume fraction $V_f$ of fibers into a proportion $X_f$ of the supply of fibers comparing the fibers in the second layer to the fibers in the first fiber layer so that the fiber surface area fraction $S_{f1,i}^P$ and the fiber surface area fraction $S_{f2,i}^P$ for each fiber layer is less than 0.65;

providing a supply of loose, individual fibers according to the above-calculated fiber surface area fraction $S_{f1,i}^P$;

providing a moving web;

depositing the first layer of loose, individual fibers upon the web;

depositing a layer of settable slurry upon the first layer of individual, loose fibers;

depositing the second layer of loose, individual fibers upon the layer of settable slurry; and embedding the loose, individual fibers in the slurry so that the multiple layers of fibers are distributed throughout each slurry layer in the panel.

While a particular embodiment of the present slurry feed apparatus for fiber-reinforced structural cementitious panel production has been shown and described, it will be appreciated by those skilled in the art that changes and modifications may be made thereto without departing from the invention in its broader aspects and as set forth in the following claims.

What is claimed is:

1. A handheld wet slurry thickness measuring gauge comprising;

a distance displacement measurement gauge comprising a case, a vertical stem, and a vertical spindle, the case comprising a case body, the stem extends from the case body, the spindle is slidably supported to move in an axial direction within the stem, the case body having a digital or analog display for indicating a moving linear displacement amount of the spindle, wherein the moving linear displacement of the spindle is indicated on the display in directly readable numerals;

a skirt releasably and slidably attached to the distance displacement measurement gauge, the skirt having a central through-hole for receiving the stem of the gauge and retaining the stem in an upright position, the skirt having a lower wall below the case body;

a measuring platen having a platen base and a platen shaft extending upwardly from the platen base, the platen base being below the case body, an end of the platen shaft distal to the platen base is attached to an end of the spindle distal to the case body; and support legs mounted on the skirt to extend downwardly from the skirt to be below the case body;

the spindle extending downwardly below the skirt and case body.

2. The thickness gauge of claim 1, wherein the spindle extends from the stem, the skirt releasably and slidably attached to the stem of the distance displacement measurement gauge.

3. The thickness gauge of claim 1, wherein the support legs ends distal to the skirt are pointed and the platen shaft is attached to the platen base.

4. The thickness gauge of claim 1, wherein the platen shaft has a threaded portion at the top of the platen shaft screwed into a threaded aperture at the bottom of the spindle.

5. The gauge of claim 4, wherein the threaded portion of the platen is made of steel.

6. The thickness gauge of claim 1, the legs are secured in holes in a bottom wall of the skirt.

7. The thickness gauge of claim 1, wherein there are at least three support legs extending from the skirt.

8. The thickness gauge of claim 1, wherein there are three pointed support legs extending from the skirt.

9. The thickness gauge of claim 1, wherein the skirt base has sidewalls and a bottom wall, the bottom wall of the skirt base has at least three blind holes open within an outer annular portion of the bottom wall of the skirt base, the sidewalls have threaded holes which respectively communicate with the blind holes, and the legs are respectively secured within the blind holes by Allen screws mounted in the side holes.

10. The thickness gauge of claim 1, having a clamping screw to releasably retain the skirt to the stem.

11. The thickness gauge of claim 1, having a clamping screw to releasably retain the skirt to the stem, wherein the clamping screw is offset.

12. The thickness gauge of claim 1, wherein a bottom wall of the platen in an at rest position, and ends of the legs distal to the skirt extend the same distance below the skirt.

13. A method for using a handheld wet slurry thickness measuring gauge comprising;

a distance displacement measurement gauge comprising a case, a vertical stem, and a vertical spindle,
the case comprising a case body,
the stem extends from the case body,
the spindle is slidably supported to move in an axial direction within the stem,
the case body having a digital or analog display for indicating a linear displacement amount of the spindle, wherein the moving linear displacement of the spindle is indicated on the display in directly readable numerals;
a skirt releasably and slidably attached to the distance displacement measurement gauge, the skirt having a central through-hole for receiving the stem of the gauge and retaining the stem in an upright position, the skirt having a lower wall below the case body;
a measuring platen having a platen base and a platen shaft extending upwardly from the platen base, the platen base being below the case body, an end of the platen shaft distal to the platen base is attached to an end of the spindle distal to the case body; and
support legs mounted on the skirt to extend downwardly from the skirt to be below the case body;
the spindle extending downwardly below the skirt and case body,
comprising the steps of:
inserting the legs into a slurry and locating a bottom wall of the platen on an upper surface of the slurry.

14. The method of claim 13, wherein a) three support legs and the measuring platen are placed on the top surface of the slurry, b) then the thickness gauge is pressed down to push the legs into the slurry until the legs rest on a support underlying the slurry while a bottom wall of the platen rests on the top surface of the slurry and pressure of the top surface of the slurry on the bottom wall of the platen forces the platen shaft upwards to push the measuring spindle upwards; and c) the distance the platen has been pushed upwards is measured and registered on the display to show the thickness of the slurry.

15. The method of claim 14, wherein steps a, b and c are repeated over an entire cross section of the slurry to determine if there is any significant variation in the thickness of the slurry layer.

16. The method of claim 13, wherein the platen is manually raised before inserting the legs into the slurry and, after inserting the legs into the slurry until the legs rest on a support underlying the slurry, the platen is lowered to locate the bottom wall of the platen on the upper surface of the slurry.

17. The method of claim 13, wherein the spindle extends from the stem, the skirt releasably and slidably attached to the stem of the distance displacement measurement gauge.

18. The method of claim 13, wherein the support legs ends distal to the skirt are pointed.

19. The thickness gauge of claim 1, wherein an upper wall of the platen base opposes the lower wall of the skirt.

20. The method of claim 13, wherein an upper wall of the platen base opposes the lower wall of the skirt.

* * * * *